(12) United States Patent
Yamauchi

(10) Patent No.: US 7,758,433 B2
(45) Date of Patent: Jul. 20, 2010

(54) JOINT ASSEMBLY AND A TOTAL ASSEMBLY OF BEARING APPARATUS FOR A DRIVING WHEEL

(75) Inventor: Kiyoshige Yamauchi, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/477,991

(22) Filed: Jun. 4, 2009

(65) Prior Publication Data

US 2009/0239669 A1    Sep. 24, 2009

Related U.S. Application Data

(63) Continuation of application No. PCT/JP2007/001352, filed on Dec. 5, 2007.

(30) Foreign Application Priority Data

Dec. 5, 2006    (JP) .............................. 2006-328048

(51) Int. Cl.
*F16D 3/84* (2006.01)
(52) U.S. Cl. .................. 464/178; 464/173; 464/906
(58) Field of Classification Search ......... 464/173–175, 464/178, 904–906; 74/609; 384/544, 589
See application file for complete search history.

(56) References Cited

U.S. PATENT DOCUMENTS

| | | | | |
|---|---|---|---|---|
| 2,226,388 A | * | 12/1940 | Richter | .................... 464/175 X |
| 2,707,117 A | * | 4/1955 | Fentress et al. | ......... 464/175 X |
| 5,312,300 A | * | 5/1994 | McGregor et al. | .......... 464/175 |
| 2001/0004611 A1 | | 6/2001 | Sahashi et al. | |

FOREIGN PATENT DOCUMENTS

| | | |
|---|---|---|
| JP | 58-193285 | 11/1983 |
| JP | 2001-171308 | 6/2001 |
| JP | 2002-039399 | 2/2002 |
| JP | 2005-256938 | 9/2005 |

* cited by examiner

*Primary Examiner*—Greg Binda
(74) *Attorney, Agent, or Firm*—Harness, Dickey & Pierce, P.L.C.

(57) ABSTRACT

A joint assembly has a secured type constant velocity universal joint, a slide type constant velocity universal joint, and substantially cylindrical elastomer unit covers. The secured type constant velocity universal joint includes one outer joint member formed with a plurality of curved and axially extending first track grooves on its inner circumference. A joint inner ring is formed on its outer circumference with second track grooves opposite to the first track grooves. Torque transmitting balls are contained within ball tracks formed by the first and second track grooves. A cage rollably holds the torque transmitting balls within the ball tracks. A drive shaft has one end connected to the joint inner ring. A boot is mounted on the drive shaft and on an outer circumference at an opened side of the one outer joint member. The slide type constant velocity universal joint includes a boot mounted on the drive shaft and on an outer circumference at an opened side of the outer joint member. The unit covers have reduced diameter portions and are mounted on the outer circumferences of both the constant velocity universal joints. Each of the unit covers is formed as two parts divided along a parting plane including its axis. Each has radially extending flat abutting surfaces on the parting plane. Fastening portions are formed on the abutting surfaces and adapted to be engaged, via an elastic deformation of them, so that the unit covers are detachably mounted on both the constant velocity universal joints.

5 Claims, 7 Drawing Sheets

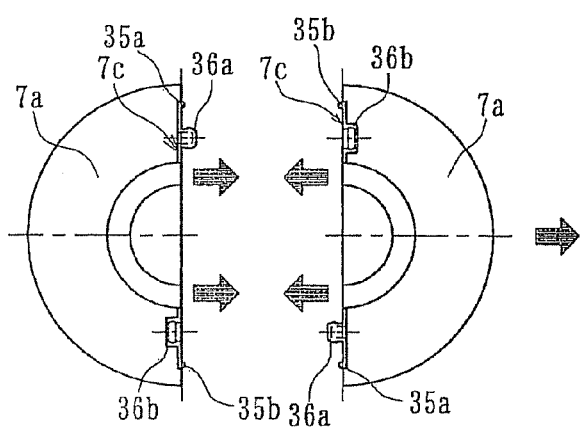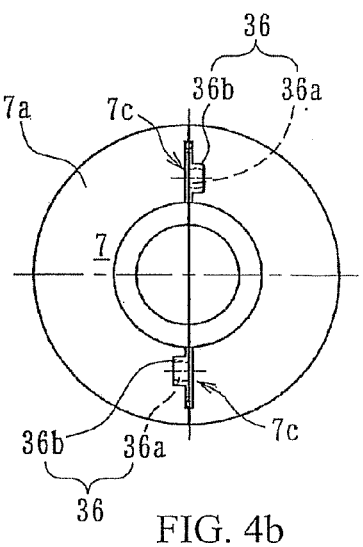
FIG. 4a        FIG. 4b
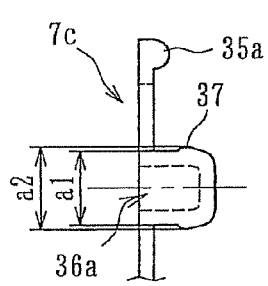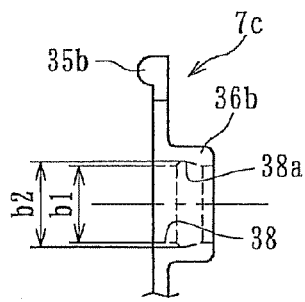
FIG. 5a        FIG. 5b
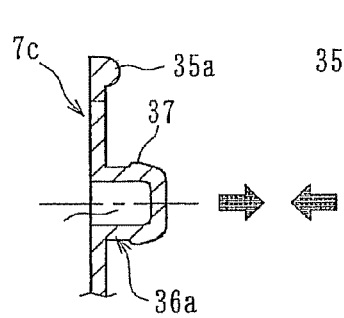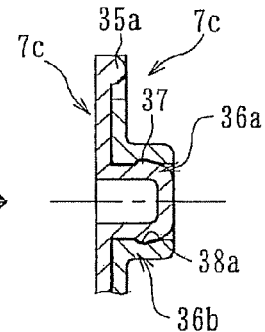
FIG. 6a        FIG. 6b

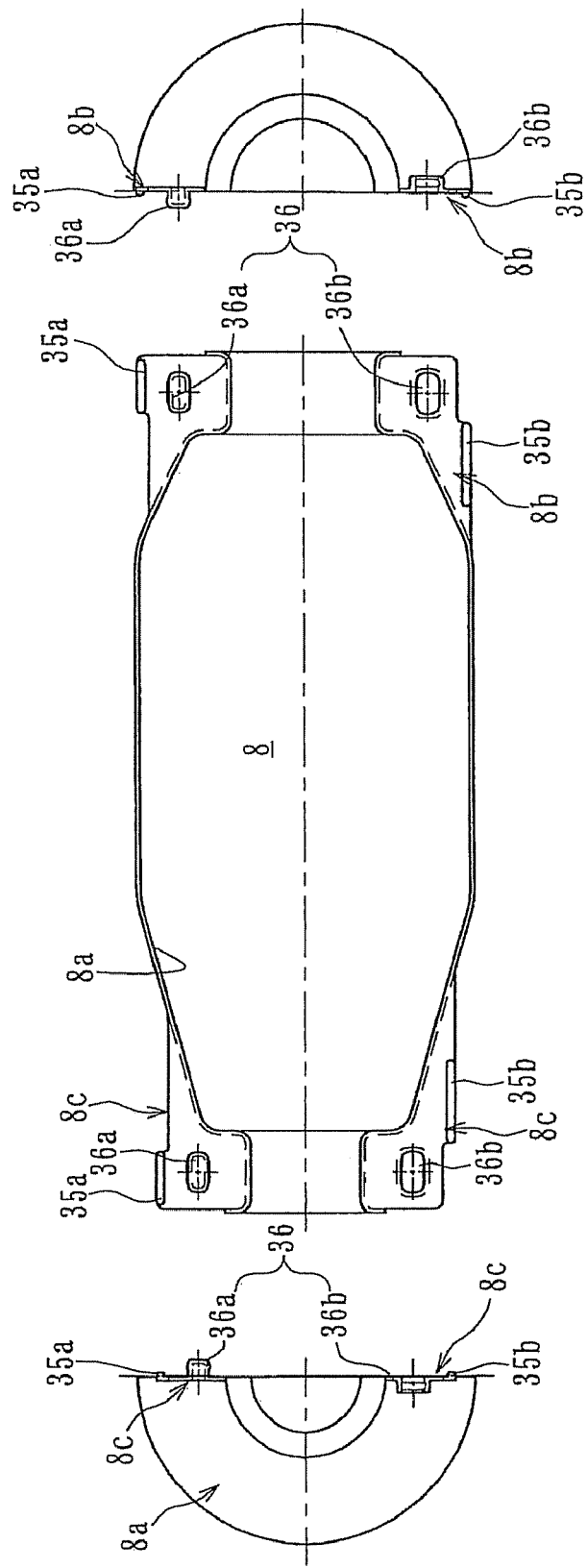

JOINT ASSEMBLY AND A TOTAL ASSEMBLY OF BEARING APPARATUS FOR A DRIVING WHEEL

CROSS-REFERENCE TO RELATED APPLICATIONS

This application is a continuation of International Application No. PCT/JP2007/001352, filed Dec. 5, 2007, which claims priority to Japanese Application No. 2006-328048, filed Dec. 5, 2006. The disclosures of the above applications are incorporated herein by reference.

FIELD

The present disclosure relates to a joint assembly with a constant velocity universal joint that has a unit cover mounted and a drive shaft connected to the constant velocity universal joint, and to a total assembly of a driving wheel bearing apparatus.

BACKGROUND

A power transmitting apparatus to transmit an engine power of a vehicle, such as an automobile etc., to the vehicle wheels requires not only transmission of the engine power to the wheels but enable radial and axial displacements and a moment displacement of the wheels caused by bounds of wheel or turning of vehicle during running on a rough road. Accordingly, an engine side (e.g. a transmission) and a wheel are connected via a drive shaft. One end is connected to a differential apparatus, via a slide type constant velocity universal joint. The other end is connected to a wheel via a wheel bearing apparatus that includes a secured type constant velocity universal joint.

Wheel bearing apparatus has evolved from a first generation type, using a single double row rolling bearing, to a second generation type, where an outer member is integrally formed with a body mounting flange. Furthermore, the wheel bearing apparatus has been developed from the second generation type to the third generation type. In the third generation type, one inner raceway surface of the double row rolling bearing is formed on the outer circumference of a wheel hub integrally formed with a wheel mounting flange. A fourth generation type includes the wheel hub integrally formed with a constant velocity universal joint. An outer joint member forming the constant velocity universal joint is formed, on its outer circumference, with the other inner raceway surface of the double row rolling bearing.

This application proposes a driving wheel bearing apparatus of the fourth generation type. The unit cover/joint assembly as well as the total assembly of the bearing apparatus for a driving wheel provided with the unit cover/joint assembly is shown in FIG. 9. In the description below, the term "outer side" (left hand side in the drawings) of the apparatus means a side that is positioned outside of the vehicle body. The term "inner side" (right hand side in the drawings) of the apparatus means a side that is positioned inside of the body when the bearing apparatus is mounted on the vehicle body.

The driving wheel bearing apparatus is formed as a unit including a wheel hub 51, a double row rolling bearing 52 and a constant velocity universal joint 53. The wheel hub 51 has a wheel mounting flange 54 at its outer side end. The wheel hub 51 is formed with an outer side inner raceway surface 51a on its outer circumference. Its inner circumference includes a hardened irregular portion 55.

The double row rolling bearing 52 includes an outer member 57, an inner member 58 and double row balls 56, 56. The outer member 57 has a body mounting flange 57b on its outer circumference. The body mounting flange 57b is mounted on a knuckle N and is formed with double row outer raceway surfaces 57a, 57a on its inner circumference. The inner member 58 has the wheel hub 51 and outer joint member 60 of the constant velocity universal joint 53 formed with inner side inner raceway surface 60a on its outer circumference.

The constant velocity universal joint 53 includes the outer joint member 60, a joint inner ring 61, cage 62, and torque transmitting balls 63. The outer joint member 60 has a cup shaped mouth portion 64, a shoulder portion 65 that forms a bottom of the mouth portion 64, and a hollow shaft portion 66 that axially extends from the shoulder portion 65. The shaft portion 66 is formed with a cylindrical portion 66a on its outer circumference. A fitting portion 66b axially extends from the cylindrical portion 66a. The wheel hub 51 and the outer joint member 60 are integrally connected, via plastic deformation, by inserting the shaft portion 66 into the wheel hub 51 and then by inserting an expanding tool, such as a mandrel, into the shaft portion 66 to radially expand the fitting portion 66b to bite into the irregular portion 55.

This driving wheel bearing apparatus is connected to a joint assembly JA. The joint assembly JA has a secured type (i.e. axially immovable type) constant velocity universal joint 53 that include the outer joint member 60. A drive shaft 67 has one end that is connected to the joint inner ring 61. A boot 68 is mounted on one end to the drive shaft 67 and on the other end to an opened side outer circumference of the outer joint member 60. A sliding type constant velocity universal joint 71 includes a boot 70. The boot 70 is mounted on one end to the drive shaft 67 and on the other end to an opened side outer circumference of the outer joint member 69. An outer diameter Da of the fitting surface 57c of the outer member 57 is formed larger than that of the constant velocity universal joint 53. An elastomer unit cover 72, of elastomer having a substantially cylindrical configuration and reduced diameter portions 72a, 72b at both of its ends, is mounted so that it covers the outer circumference of the joint assembly JA.

This structure not only protects the joint assembly JA but also enables easier handling during transportation. In addition the provision of the reduced diameter portions 72a, 72b at both ends of the unit cover 72 enables it to elastically mount onto the outer joint member 60 of the constant velocity universal joint 53. Thus, this prevents slipping off of the unit cover 72. Accordingly, it is possible to provide a joint assembly as well as a total assembly of a driving wheel bearing apparatus with the joint assembly that improves the workability in assembling it onto a body of vehicle and the quality of the bearing apparatus. (Japanese Laid-open Patent Publication No. 256938/2005)

However in the total assembly of a driving wheel bearing assembly of the prior art, since the unit cover 72 is formed as a monolithic structure, problems exist of requiring time not only of mounting the unit cover 72 to the joint assembly JA but also of demounting it therefrom without damaging the boot 68 after completion of mounting the total assembly of the driving wheel bearing apparatus to a body of the vehicle.

SUMMARY

It is therefore an object of the present disclosure to provide a joint assembly as well as a total assembly of a driving wheel bearing apparatus with the joint assembly, that improves detachability of the unit cover to protect the constant velocity universal joint during transportation and assembly to a vehicle. Also, it can improve the workability during assembly of the total assembly of the bearing to a vehicle.

To achieve the objects, a joint assembly comprises a secured type constant velocity universal joint, a slide type constant velocity universal joint, and substantially cylindrical elastomer unit covers. The secured type constant velocity universal joint includes one outer joint member. The outer joint member is formed with a plurality of curved and axially extending track grooves on its inner circumference. A joint inner ring is formed with track grooves opposite to the track grooves on its outer circumference. Torque transmitting balls are contained within ball tracks formed by the track grooves. A cage rollably holds the torque transmitting balls within the ball tracks. A drive shaft has one end connected to the joint inner ring. A boot is mounted on the drive shaft and on an outer circumference at an opened side of the one outer joint member. The slide type constant velocity universal joint includes a boot mounted on the drive shaft and on an outer circumference at an opened side of the outer joint member. The unit covers have reduced diameter portions and are mounted on the outer circumferences of both the constant velocity universal joints. Each of the unit covers is formed as two parts divided along a parting plane including its axis. Each part has radially extending flat abutting surfaces on the parting plane. Fastening portions are formed on the abutting surfaces and are adapted to be engaged, via an elastic deformation of them, so that the unit covers are detachably mounted on both the constant velocity universal joints.

The joint assembly comprises the pair of constant velocity universal joints and the drive shaft connecting these universal joints. The elastomeric unit cover has reduced diameter ends that mount the cover to the outer circumferences of the universal joints. Each of the unit covers is formed as two parts divided along a parting plane including its axis. It has radially extending flat abutting surfaces on the parting plane. Fastening portions are formed on the abutting surfaces and are adapted to be engaged, via an elastic deformation of them, so that the unit covers are detachably mounted on both the constant velocity universal joints. It is possible to easily unite and separate the two piece unit cover. Thus, it improves the mounting and demounting workability of the total assembly of the bearing apparatus to a vehicle. Also, the cover prevents the assembly from being damaged during its assembly to a vehicle and from being hung down by its own weight during transportation or handling.

Each of the fastening portions comprises a projecting portion with a tip of an enlarged diameter and a recessed portion with an annular groove formed at substantially a center of an inner diameter portion. The tip of the projection is adapted to be fit into the annular groove. The tip elastically expands the inner diameter portion. This surely prevents separation of the two piece unit cover.

Hooks are formed on the outer circumstances of the abutting surfaces. The hooks and the other hooks are arranged at axially offset positions with respect to each other. This makes it possible to easily separate the two piece unit cover by only pushing out the hook portions. Thus, this improves the workability during assembly and separation of the unit cover.

Each of the unit covers is formed with a symmetrical configuration. This makes it possible to use only one set of molds to manufacture the unit cover. Thus, this further reduces manufacturing cost and improves the workability during assembly.

To achieve the objects, a total assembly of driving wheel bearing apparatus comprises a driving wheel bearing apparatus formed as a unit of a wheel hub, a double row rolling bearing, a constant velocity universal joint and an outer joint member integrally connected to the wheel hub, via plastic deformation. An above joint assembly is connected to the driving wheel bearing apparatus. The double row rolling bearing includes an outer member integrally formed with a body mounting flange on its outer circumference to be mounted on a knuckle. A fitting surface is fit into the knuckle. Its inner circumstance includes double row outer raceway surfaces. An inner member comprises the wheel hub integrally formed at one end with a wheel mounting flange. Its outer circumference includes an inner raceway surface opposed to one of the double row outer raceway surfaces. The outer joint member of the constant velocity universal joint is integrally formed with a hollow shaft portion fit into the wheel hub. Its outer circumference includes inner raceway surface opposed to the other one of the double row outer raceway surfaces. Double rows of rolling elements are freely rollably contained between the inner member and the outer member. A pitch circle diameter of an inner side row of rolling elements of the double rows of rolling elements is set larger than that of an outer side row of rolling elements. An outer diameter of a fitting surface of the outer member is formed larger than maximum outer diameters of the joint assembly.

The total assembly of the driving wheel bearing apparatus comprises the driving wheel bearing apparatus with the wheel hub and the outer joint member axially integrally connected, via plastic deformation therebetween. A joint assembly is connected to the bearing assembly. A pitch circle diameter of an inner side row of rolling elements of the double rows of rolling elements is set larger than the diameter of an outer side row of rolling elements. An outer diameter of a fitting surface of the outer member is formed larger than maximum outer diameters of the joint assembly. Thus, it is possible to reduce the weight and size of the total assembly of the bearing apparatus. Also, it is possible to increase the bearing rigidity and thus to extend the life of the bearing assembly. In addition, it is possible to easily fit the joint assembly into the knuckle without being damaged. Also, it is possible to prevent adhesion of contamination to the total assembly of the bearing apparatus and thus causes damage. Additionally, it is possible to keep the total assembly in a mounted condition to the knuckle until completion of the assembly of the corner modules of the suspension apparatus and a vehicle. Thus, it is possible to further improve not only the handling, such as transportation, but the workability during assembly.

The joint assembly comprises a secured type constant velocity universal joint, a slide type constant velocity universal joint and substantially cylindrical elastomeric unit covers. The secured type constant velocity universal joint includes one outer joint member formed with a plurality of curved and axially extending track grooves on its inner circumference. A joint inner ring is formed with track grooves, opposite to the other track grooves, on its outer circumference. Torque transmitting balls are contained within ball tracks formed by the track grooves. A cage rollably holds the torque transmitting balls within the ball tracks. A drive shaft has one end connected to the joint inner ring. A boot is mounted on the drive shaft and on an outer circumference at an opened side of the one outer joint member. The slide type constant velocity universal joint includes a boot mounted on the drive shaft and on an outer circumference at an opened side of the outer joint member. The unit covers have reduced diameter portions and are mounted on the outer circumferences of both the constant velocity universal joints. Each of the unit covers is formed as two parts divided along a parting plane including its axis. It has radially extending flat abutting surfaces on the parting plane. Fastening portions are formed on the abutting surfaces and are adapted to be engaged, via an elastic deformation of them, so that the unit covers are detachably mounted on both the constant velocity universal joints. Thus, it is possible to easily unite and separate the two piece unit cover. Thus, this improves the mounting and demounting workability of the total assembly of the bearing apparatus onto a vehicle while preventing the assembly from being damaged during its assembly to a vehicle. Also, it prevents damage as the assembly is hung down by its own weight during transportation or handling.

The total assembly of the driving wheel bearing apparatus comprises a driving wheel bearing apparatus formed as a unit with a wheel hub, a double row rolling bearing, a constant velocity universal joint and an outer joint member integrally connected to the wheel hub, via plastic deformation. A joint assembly, as descry bed above, is connected to the driving wheel bearing apparatus. The double row rolling bearing includes an outer member integrally formed, on its outer circumstance, with a body mounting flange to be mounted on a knuckle. A fitting surface is fit into the knuckle. Its inner circumstance includes double row outer raceway surfaces. An inner member comprises the wheel hub integrally formed at one end with a wheel mounting flange. Its outer circumference includes an inner raceway surface opposed to one of the double row outer raceway surfaces. The outer joint member of the constant velocity universal joint is integrally formed with a hollow shaft portion fit into the wheel hub. Its outer circumference includes an inner raceway surface opposed to the other one of the double row outer raceway surfaces. Double rows of rolling elements are freely rollably contained between the inner member and the outer member. A pitch circle diameter of an inner side row of rolling elements of the double rows of rolling elements is set larger than a pitch circle diameter of an outer side row of rolling elements. An outer diameter of a fitting surface of the outer member is formed larger than maximum outer diameters of the joint assembly. Thus, it is possible to reduce the size and weight of the total assembly of the bearing apparatus. Also, it is possible to increase the bearing rigidity and thus to extend the life of the bearing assembly. In addition, it is possible to easily fit the joint assembly into the knuckle without being damaged. Also, it is possible to prevent adhesion of contamination to the total assembly of the bearing apparatus and causing damage to it. Additionally, it is possible to keep the total assembly in a mounted condition to the knuckle until completion of assembly of the corner modules of the suspension apparatus and a vehicle. Thus, it is possible to further improve not only handling, such as transportation, but also workability during assembly.

A joint assembly comprises a secured type constant velocity universal joint, a slide type constant velocity universal joint, and substantially cylindrical elastomeric unit covers. The secured type constant velocity universal joint includes one outer joint member formed with a plurality of curved and axially extending track grooves on its inner circumference. A joint inner ring is formed on its outer circumference, with track grooves opposite to the other track grooves. Torque transmitting balls are contained within ball tracks formed by the track grooves. A cage rollably holds the torque transmitting balls within the ball tracks. A drive shaft has one end connected to the joint inner ring. A boot is mounted on the drive shaft and on an outer circumference at an opened side of the one outer joint member. The slide type constant velocity universal joint includes a boot mounted on the drive shaft and on an outer circumference at an opened side of the outer joint member. The unit covers have reduced diameter portions and are mounted on the outer circumferences of both the constant velocity universal joints. Each of the unit covers is formed as two parts divided along a parting plane including its axis. Each has radially extending flat abutting surfaces on the parting plane. Hooks are formed on the outer circumstances of the abutting surfaces. The hooks are arranged at axially offset positions with respect to each other. Recessed and projecting portions are formed on a substantially central portion of the abutting surfaces. A tip of the projecting portion is radially expanded. The recessed portion has an annular groove formed on a substantially central portion of the inner circumference of the abutting surface. The unit cover can be detachably mounted on the pair of the constant velocity universal joint by abutting the abutting surfaces and engaging them, via an elastic deformation of the recessed portions and the projected portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 3A, 3B, 3C:
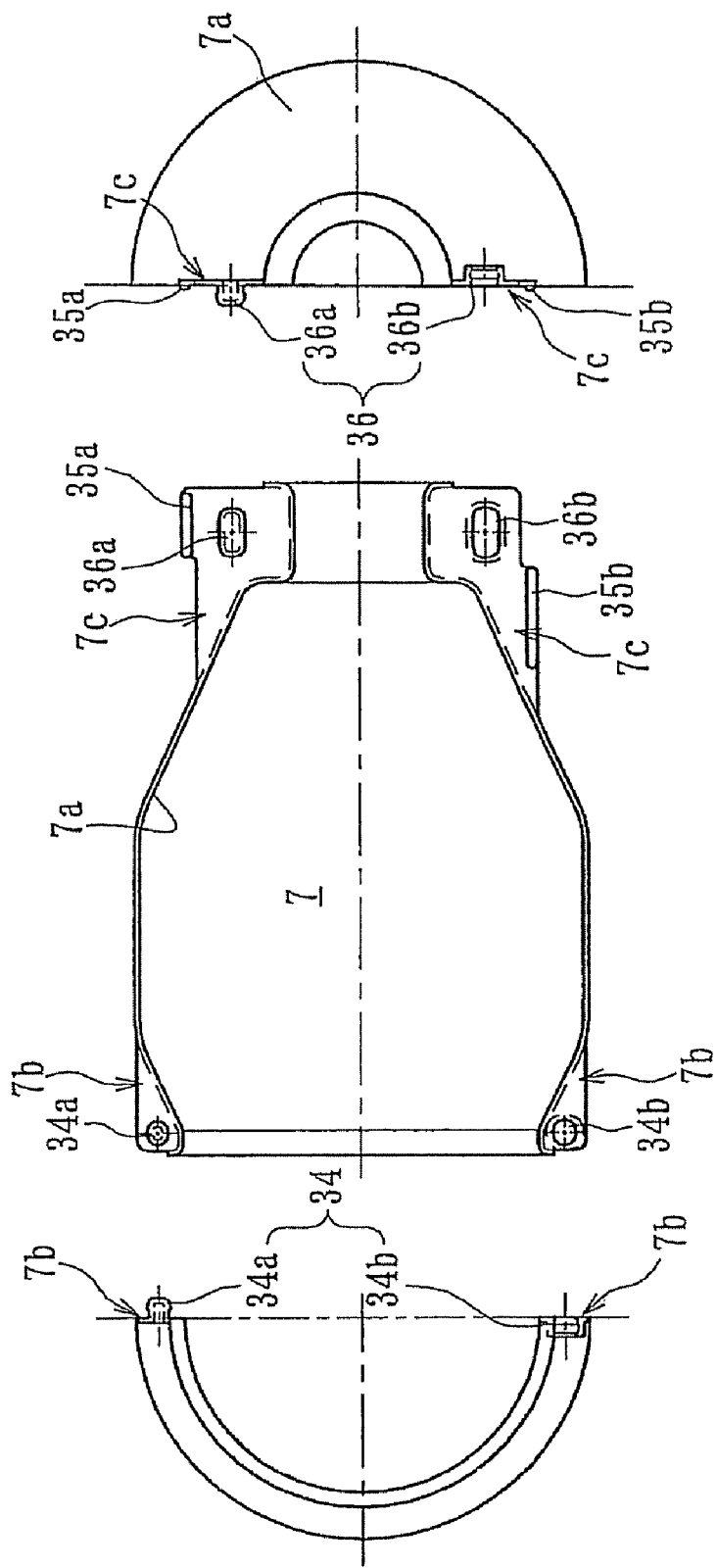

FIGS. 3(a), (b) and (c) are, respectively, a front elevation view, a left side elevation view, and a right elevation view of a unit cover for a secured type constant velocity universal joint;

FIGS. 4(a) and (b) are explanatory views of a uniting method of the unit cover.

FIGS. 5(a) and (b) are partially enlarged views of a fastening portion of the unit cover.

FIGS. 6(a) and (b) are partially enlarged views of a fastening method of the unit cover.

FIGS. 7(a), (b) and (c) are, respectively, a front elevation view, a left side elevation view, and a right elevation view of a unit cover for a sliding type constant velocity universal joint.

Figures 8A, 8B:
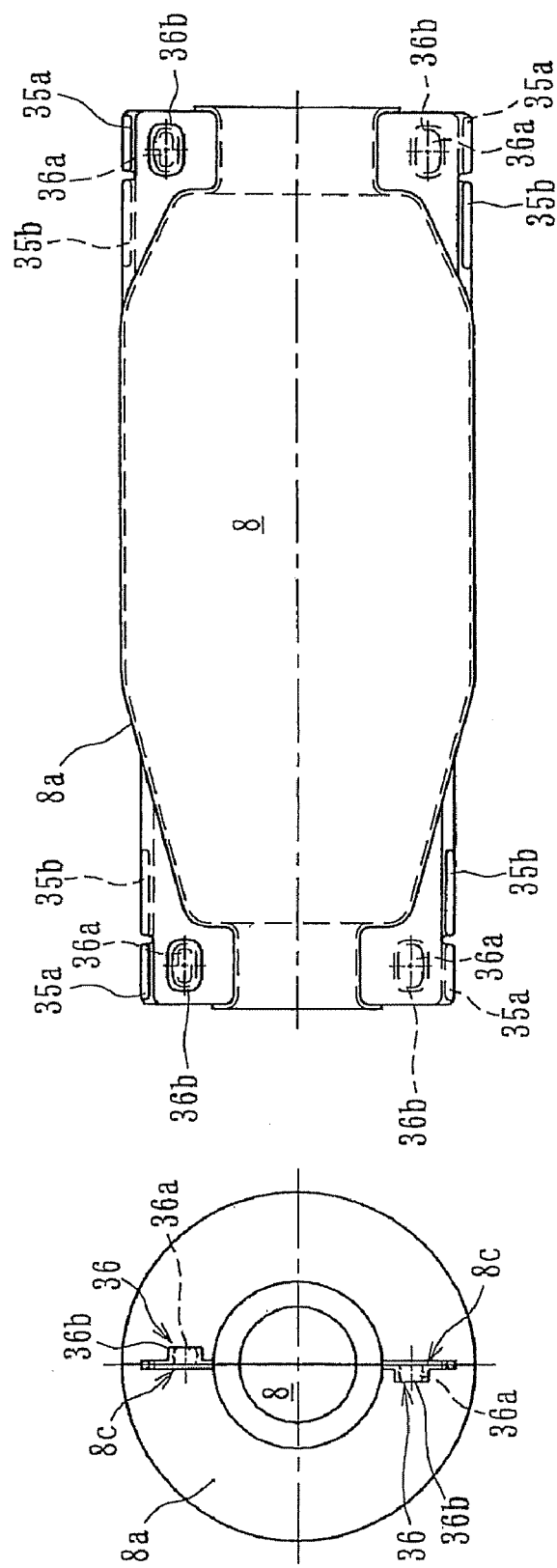

FIGS. 8(a) and (b) are, respectively, a front elevation view and a left side elevation view of a united unit cover.

Figure 9:
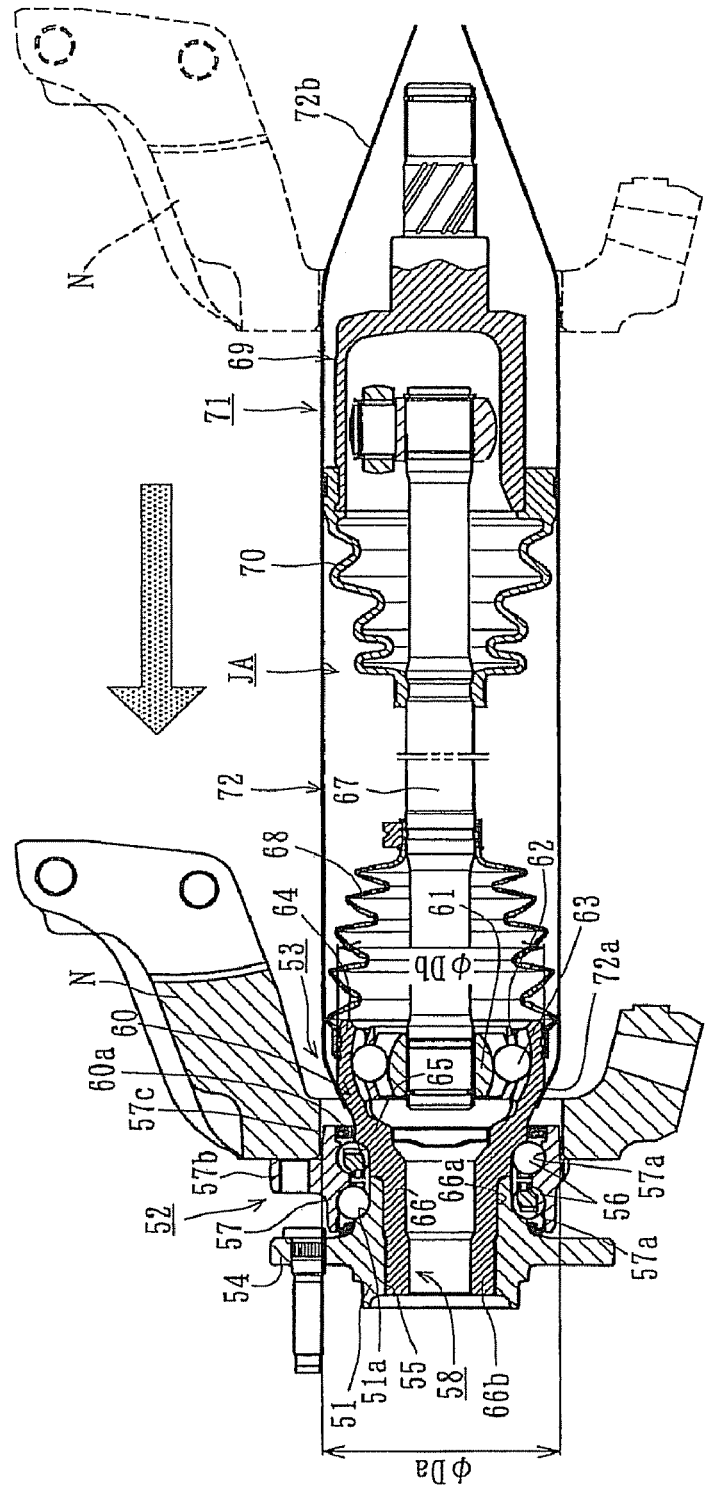

FIG. 9 is a longitudinal section view of a prior art driving wheel bearing apparatus with a mounted unit cover.

DETAILED DESCRIPTION

One preferable embodiment will be hereinafter described with reference to the drawings.

Figure 1:
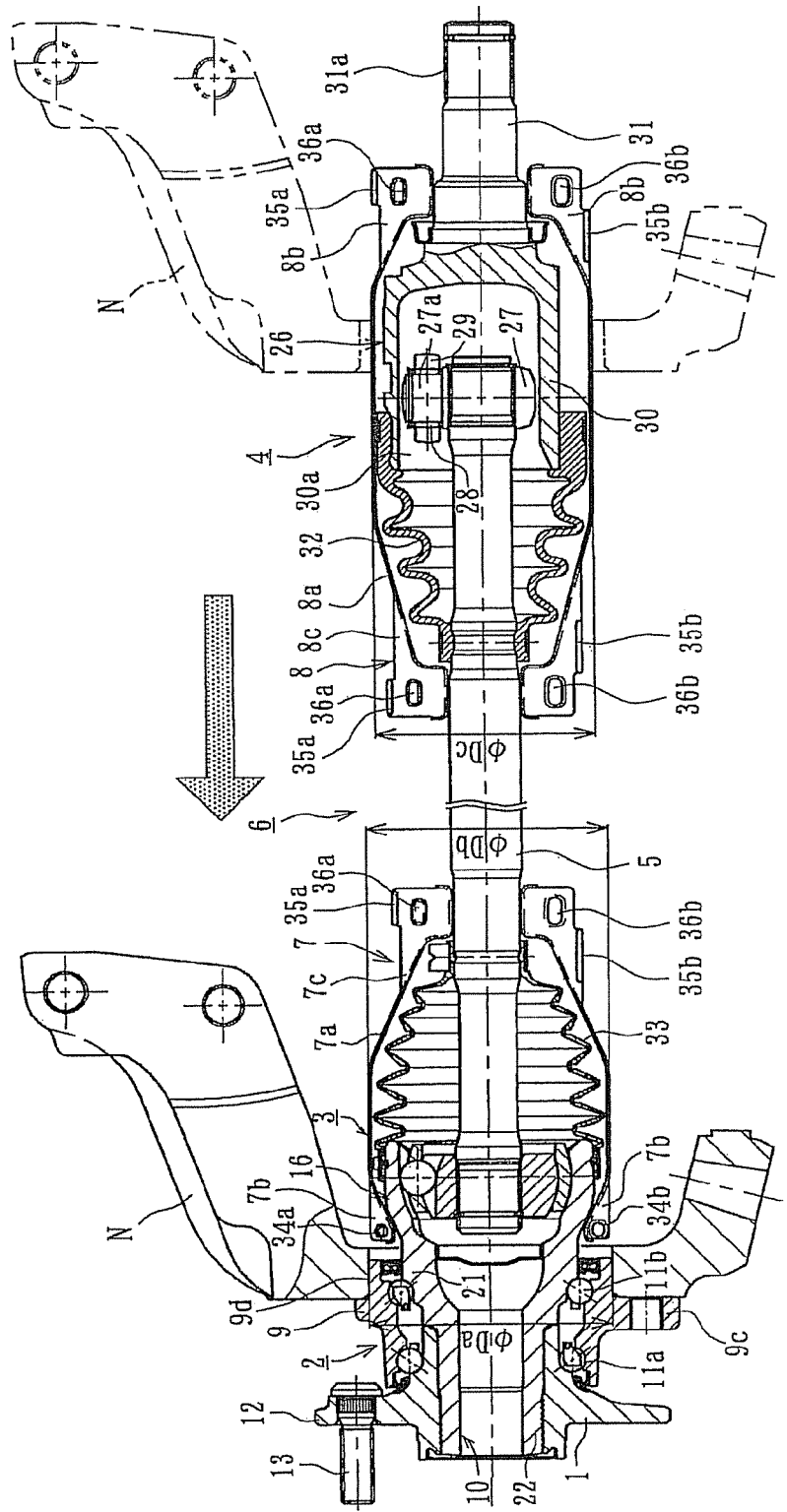
FIG. 1 is a longitudinal section view of one embodiment of a total assembly of a driving wheel bearing apparatus with a mounted unit cover.
Figure 2:
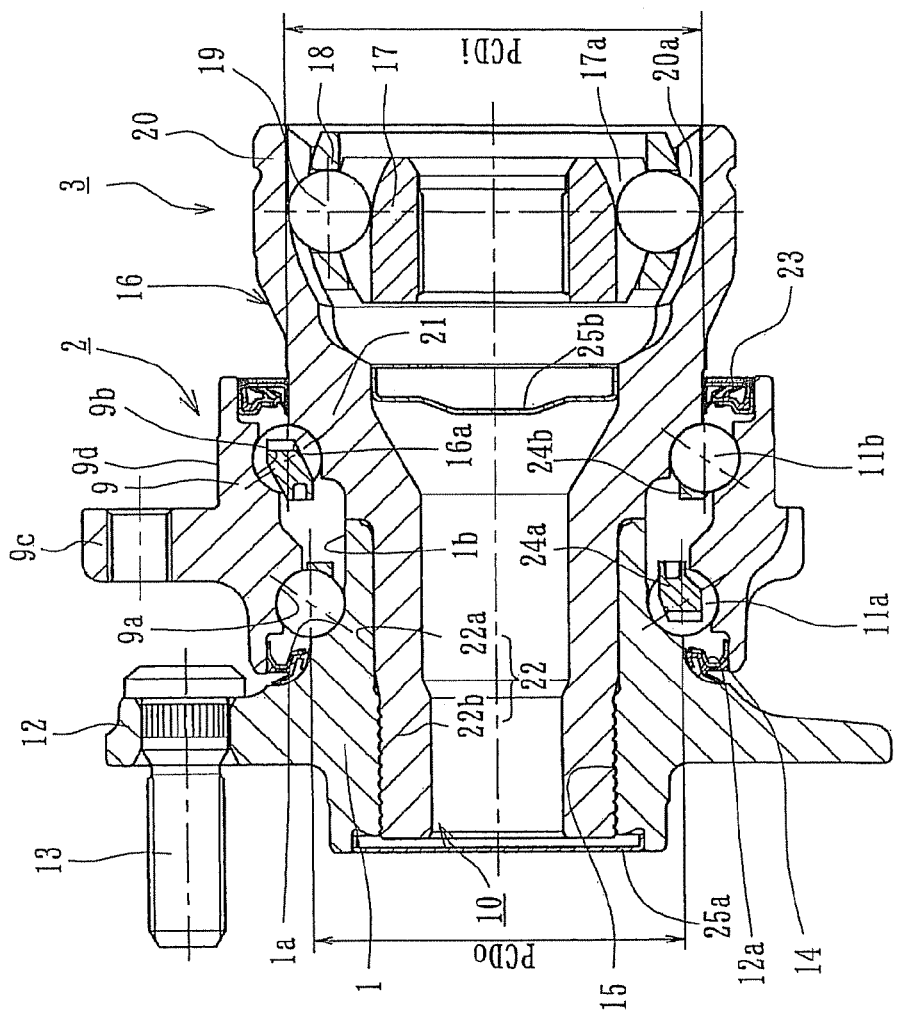
FIG. 2 is a longitudinal section view of a driving wheel bearing apparatus.

FIG. 1 is a longitudinal section view of one embodiment of a total assembly of a driving wheel bearing apparatus with a mounted unit cover. FIG. 2 is a longitudinal section view of a driving wheel bearing apparatus. FIGS. 3(a), (b) and (c) are, respectively, a front elevation view, a left side elevation view, and a right elevation view of a unit cover for a secured type constant velocity universal joint. FIGS. 4(a) and (b) are explanatory views of a uniting method of the unit cover. FIGS. 5(a) and (b) are partially enlarged views of a fastening portion of the unit cover. FIGS. 6(a) and (b) are partially enlarged views of a fastening method of the unit cover. FIGS. 7(a), (b) and (c) are respectively a front elevation view, a left side elevation view, and a right elevation view of a unit cover for a sliding type constant velocity universal joint. FIGS. 8(a)

and (b) are respectively a front elevation view and a left side elevation view of a united unit cover.

The total driving wheel bearing assembly comprises a driving wheel bearing apparatus that transmits power from an engine to a wheel (not shown) and rotationally supports the wheel relative to a suspension apparatus. A pair of constant velocity universal joints 3, 4 with mounted unit covers 7, 8 are also included. A drive shaft 5 connects the constant velocity universal joints 3, 4. In addition, the driving wheel bearing assembly is a so-called fourth generation type that includes a wheel hub 1, a double row rolling bearing 2 and the constant velocity universal joint 3 combined as a unit.

As shown in FIG. 2, the double row rolling bearing 2 includes an outer member 9, an inner member 10 and double row balls 11a, 11b. The inner member includes the wheel hub 1 and an outer joint member 16 inserted into the wheel hub 1.

The outer member 9 is made of medium carbon steel such as S53C including carbon of 0.40~0.80% by weight. It is integrally formed, on its outer circumference, with a body mounting flange 9c adapted to be mounted on a knuckle N. Its inner circumference is formed with double row outer raceway surfaces 9a, 9b. Each raceway surface 9a, 9b has a circular arc cross-section. The double row outer raceway surfaces 9a, 9b are hardened by high frequency induction hardening to have a surface hardness of about 58~64 HRC.

The wheel hub 1 is made of medium carbon steel such as S53C including carbon of 0.40~0.80% by weight. Its outer side end has a wheel mounting flange 12 to mount a wheel. A plurality of hub bolts 13 are equidistantly arranged along the periphery of the wheel mounting flange 12. The wheel hub 1 has, on its outer circumference, one inner raceway surface 1a arranged opposite to outer side raceway surface (9a) of the double row outer raceway surfaces 9a, 9b. A cylindrical portion 1b axially extends from the inner raceway surface 1a. The wheel hub 1 is formed with a hardened layer having a surface hardness of 58~54 HRC. It is formed by high frequency induction hardening. The hardened surface extends from a seal land portion 12a, that sliding contacts an outer side seal 14, to the inner raceway surface 1a and the cylindrical portion 1b. This not only improves the anti-friction characteristics of the seal land portion 12a at the base of the wheel mounting flange 12 but also improves the durability of the wheel hub 1 by providing a sufficient mechanical strength against the rotary bending load applied onto the wheel mounting flange 12.

The inner circumference of the wheel hub 1 is formed with an irregular portion 15 formed with a hardened layer having the surface hardness of HRC 54~64. It is preferable to carry out heat treatment using high frequency induction heating that can be perform locally to easily set the depth of hardened layer. The irregular portion 15 is formed with a crisscross pattern knurl formed by combining a plurality of independent annular grooves, formed by e.g., a lathe, and a plurality of axial grooves, formed by e.g., broaching. They form orthogonally crossed grooves or mutually inclined helical grooves. Each projection forming the irregular portion 15 may be pointed like a pyramid to increase the biting ability of the irregular portion 15 into the outer circumference of a fitting portion 22b of the outer joint member 16.

The constant velocity universal joint 3 includes the outer joint member 16, a joint inner ring 17, a cage 18 and torque transmitting balls 19 and constructs a secured type (so-called "Zepper type") constant velocity universal joint. The outer joint member 16 is made of medium carbon steel such as S53C including carbon of 0.40~0.80% by weight. The joint member 16 has a cup shaped mouth portion 20, a shoulder portion 21 that forms the bottom of the mouth portion 20, and a cylindrical shaft portion 22 that axially extends from the shoulder portion 21. They are integrally or unitarily formed with each other. The shaft portion 22 is formed with a cylindrical spigot portion 22a that is fit into the cylindrical portion 1b of the wheel hub 1, via a predetermined radial gap. A fitting portion 22b at the end of the spigot portion 22a.

An inner surface of the mouth portion 20 is formed with axially extending curved track grooves 20a. An outer circumference of the joint inner ring 17 is formed with track grooves 17a that correspond to the track grooves 20a. Torque transmitting balls 19 are contained between these track grooves 20a, 17a, via a cage 18. An outer circumference of the shoulder portion 21 is formed with inner raceway surface 16a. The inner raceway surface 16a has a circular arc cross-section corresponding to one of the double row raceway surfaces 9a, 9b. A hardened layer, formed by high frequency induction heating on the track groove 20a, has a surface hardness of HRC 58~64. The hardened layer is in a region from a seal land portion that is in sliding contact with the inner side seal 23, to the inner raceway surface 16a and the shaft portion 22. The fitting portion 22b itself of the shaft portion 22 remains as a raw material without being hardened after it has been forged.

Double row balls (rolling elements) 11a, 11b are arranged between the double row outer raceway surfaces 9a, 9b of the outer member 9 and corresponding double row inner raceway surfaces 1a, 16a. The rolling elements are freely rollably held by cages 24a, 24b. Seals 14, 23 are arranged in annular openings formed between the outer member 9 and the inner member 10. The seals 14, 23 prevent leakage of grease contained within the bearing as well as ingress of rain water or dusts into the inside of the bearing. End caps 25a, 25b are mounted on an outer side opening of the wheel hub 1 and on an opening of a shoulder 21 of the outer joint member 16. The end caps 25a, 25b prevent the generation of rust on a connected portion via elastic deformation, and also leakage of grease sealed in the mouth portion 20. The double row rolling bearing 2 is a double row angular ball bearing of a back-to-back duplex type.

A method for combining the wheel hub 1, the double row rolling bearing 2 and the constant velocity 3 as a unit will be described.

The double row rolling elements 11a, 11b are temporally assembled on the double row raceway surfaces 9a, 9b of the outer member 9, via the cages 24a, 24b. The seals 14, 23 are mounted on both ends of the outer member 9. The wheel hub 1 and the outer joint member 16 are inserted into the outer member 9 from both sides. The shaft portion 22 of the outer joint member 16 is inserted into the wheel hub 1 until the shoulder portion 21 of the outer joint member 16 abuts the end face of the cylindrical portion 1b of the wheel hub 1. The wheel hub 1 and the outer joint member 16 are integrally connected to other by inserting a radially expanding tool such as a mandrel into the bore of the fitting portion 22b of the shaft portion 22. The material of the fitting portion 22b is plastically deformed and forced to bite into the hardened irregular portion 15. Thus, the wheel hub 1 and the outer joint member 16 can be integrally connected to each other. This makes it possible to reduce the size and weight of the wheel bearing apparatus and to improve the strength and durability of the wheel hub 1 as well as to maintain its pre-load for a long term.

Although the connection means is shown as the plastic deformation between the wheel hub 1 and the outer joint member 16, other connection means such as a serration may be used or they can be axially secured by elastically deforming the end of the shaft portion 22 of the outer joint member 16 to form a so-called swing caulking connection.

In the illustrated embodiment, a pitch circle diameter PCDi of the ball group 11b of the inner side row is larger than a pitch circle diameter PCDo of the ball group 11a of the outer side row. Since the outer diameter of each ball 11a is the same as that of ball 11b, the number of balls 11b of the inner side row is set larger than the number of balls 11a of the outer side row. This makes it possible to prevent erroneous assembly of the bearing apparatus and thus to reduce the manufacturing cost and improve the quality of the bearing apparatus.

Due to the difference in the pitch circle diameter PCDo of balls 11a of the outer side row and the pitch circle diameter PCDi of balls 11b of the inner side row, the bottom diameter of the inner raceway surface 16a of the outer joint member 16 is formed larger than the bottom diameter of the inner raceway surface 1a of the wheel hub 1. Similarly in the outer member 9, the bottom diameter of the outer raceway surface 9b of the inner side is formed larger than the bottom diameter of the outer raceway surface 9a of the outer side.

In the driving wheel bearing apparatus having such a structure, since the inner raceway surface 16a of the inner side is directly formed on the outer circumference of the shoulder portion 21 of the outer joint member 16, it is possible to form the pitch circle diameter PCDi of the inner side ball row 11b larger than the pitch circle diameter PCDo of the outer side ball row 11a. Also, it is possible to set the number of inner side ball row 11b larger than the number of outer side ball row 11a. Accordingly, it is possible to reduce the size and weight of the total assembly of the bearing apparatus and to increase the bearing rigidity and thus extend the life of the bearing assembly.

The joint assembly 6 shown in FIG. 1 includes the pair of constant velocity universal joints 3, 4 and the drive shaft 5 connected to the constant velocity universal joints 3, 4. One end of the drive shaft 5 is inserted into the joint inner ring 17 of the outer side constant velocity universal joint 3, via a serration. The other end of the drive shaft 5 is connected to the constant velocity universal joint 4. It is of the sliding type (tripod type) connected to a differential apparatus (not shown).

The inner side constant velocity universal joint 4 includes an outer joint member 26, a tripod member 27 with three leg shaft 27a equidistantly arranged, and rollers 29 rotationally mounted on the leg shaft 27a via needle rollers 28. The outer joint member 26 is a unitary body made of medium carbon steel including carbon of 0.40~0.80% by weight such as S53C. It has a hollow cylindrical portion 30 and a shaft portion 31 axially extending from the bottom of the cylindrical portion 30. The shaft portion 31 is formed on its outer circumference with serrations (or splines) 31a to connect it to the differential apparatus.

Three axially extending straight track grooves 30a are formed on the inner circumference of the cylindrical portion 30. Rollers 29 can roll on the track groove 30a. The surfaces of the track grooves 30a of the outer joint member 26 are hardened by high frequency induction quenching to form a predetermined hardened layer. An opening of the cylindrical portion 30 is covered by a synthetic rubber boot 32. The boot 32 prevents the leakage of grease contained in the cylindrical portion 30 and the ingress of rain water and dusts from the outside. Also, the boot 32 enables axial sliding of the drive shaft 5 relative to the outer joint member 26.

The configuration of the cylindrical portion 30 is not limited to a cylindrical configuration. It may be a petal shaped cross-section corresponding to the track grooves 30a. The shaft portion 31 may be integrally formed with a mounting flange to be connected to the differential apparatus. Although it is shown as an example of the inner side constant velocity universal joint 4 of a tripod type, any other sliding type constant velocity universal joint may be used. For example, other tripod type joints with a different structure and a double offset type constant velocity universal joint (DOJ) may be used.

In the illustrated embodiment of the present disclosure, the outer diameter Da of a fitting surface 9d of the outer member 9, to be fit into a knuckle N of a vehicle, is formed larger than the maximum outer diameter Db, Dc, respectively, of the constant velocity universal joints 3, 4. In this embodiment, the maximum outer diameter of a unit cover 7, 8, hereinafter described as (Da>Db≧Dc). This provides a reduction on the unsprung mass and accordingly achieves easy assembly and disassembly to and from a body of vehicle. Also, it achieves easy insertion of the joint assembly 6 into the knuckle N and easy assembly of the boots 33, 32 without damage by interference of the knuckle N.

Cylindrical unit covers 7, 8 are mounted on the pair of constant Velocity universal joints 3, 4, respectively, for covering their outer circumference. The unit covers 7, 8 are made by injection molding of an elastomer such as PA (polyamide) 66. The unit covers 7, 8 are formed of a two piece symmetrical structure separated along a parting plane that includes the longitudinal axis. The unit covers 7, 8 have at their opposite ends reduced diameter portions 7a, 8a, 7b, 8b, The reduced diameter portions 7b, 8b and 7a, 8a are adapted to be fit onto the outer joint members 16, 26 and boots 33, 32, respectively. The material of the unit covers 7, 8 are not limited to PA 66 and may be any other elastic material having elasticity and rigidity suitable for mountability, such as urethane resin e.g. PP (polypropylene), rigid urethane or expandable urethane.

The unit cover 7 of the unit covers 7, 8 to be mounted on the outer side constant velocity universal joint 3 has, as shown in FIG. 3, the reduced diameter portion 7a of a tapered configuration formed along an outline of the boot 33 and flat abutting surfaces 7b, 7c integrally formed on both of its ends. In these abutting surfaces 7b, 7c, the abutting surface 7b of a larger diameter side is formed with recess/projection portions 34. The abutting surface 7c of the reduced diameter side 7a is formed with a hook portion 35 and recess/projection portions 36.

The fastening structure of the abutting surfaces 7b, 7c will now be described in detail with reference to the examples in the reduced diameter side 7a shown in FIGS. 4~6. As shown in FIG. 4, hook portions 35a, 35b are formed on the abutting surfaces 7c at their outer circumferential edges of the two piece unit cover 7. The recess/projection portions 36 are formed on the abutting surfaces 7c at substantially their center. The hook portions 35a, 35b and the projection 36a and the recess 36b are formed one by one on the abutting surfaces 7c, 7c. This enables easy separation of the unit cover 7 since the hook portions 35a, 35b are formed at positions axially offset from each other as shown in FIG. 6. Accordingly, the hook portions 35a, 35b occupy a relative position when the abutting surfaces 7c, 7c are abutted. On the other hand, unexpected separation of the unit cover 7 can be prevented due to the engagement of the projection 36a and the recess 36b, via elastic deformation between the two.

As shown in FIG. 5, the projection (projected portion) 36a is formed as a hollow configuration. Its tip end 37 is radially expanded. The recess (recessed portion) 36b is formed with an annular groove 38a at substantially the center of an inner diameter portion 38. Accordingly, the tip 37 of the projection 36a is adapted to be fit into the annular groove 38a with the tip 37 elastically expanding the inner diameter portion 38. That is, an outer diameter "a1" of the base of the projection 36a is formed smaller than an inner diameter "b1" of the inner diameter portion 38 of the recess 36b (a1<b1). An outer diameter "a2" of the tip 37 of the projection 36a is formed slightly smaller than an inner diameter "b2" of the annular groove 38a of the recess 36b (a2<b2). The outer diameter "a2" of the tip 37 of the projection 36a is formed larger than the inner diameter "b1" of the inner diameter portion 38 of the recess 36b (a2>b1).

As described above, in the preferable embodiment, since the two piece unit cover 7 is formed with hook portions 35a, 35b and recess/projection portions 36 on the abutting surfaces 7c, they can engage each other using the elastic deformation of the recess/projection portions 36. Thus, it is possible to easily separate the two piece unit cover by only pushing out the hook portions. Thus, this improves the workability during assembly and separation of the unit cover. In addition, since each of said unit covers is formed with a symmetrical configuration, it is possible to use only one set of molds to manufacture the unit cover. This further reduces manufacturing cost and improves the workability during assembly.

The unit cover 8, of the unit covers 7, 8, mounted on the inner side constant velocity universal joint 4 has, as shown in FIG. 7, the reduced diameter portion 8a of a tapered configuration formed along an outline of the boot 32. Flat abutting surfaces 8b, 8c are integrally formed on both its ends. The same reference numerals are used herein as those used in the unit cover 7 of FIG. 3. Thus, a detailed description of them will be omitted. Hook portions 35a, 35b are formed on the outer circumferential edges of abutting surfaces 8b, 8c. Recess/projection portions 36 are formed on substantially the center of the abutting surfaces 8b, 8c. The recess/projecting portion 36 includes a projection 36a and recess 36b.

The pair of unit covers 8 can be united by abutting the surfaces 8c, 8c and engaging the projections 36a and the recesses 36b with each other using their elasticity. In the illustrated embodiment, it is shown that both the hook portions 35a, 35b and the recess/projection portions 36 are formed on the abutting surfaces 7c, 8b, 8c. It may be possible to omit the hook portions and to form only the recess/projection portions 36.

The two piece type unit covers 7, 8 are mounted on the pair of constant velocity universal joints 3, 4. The outer circumference of the joint assembly 6 is covered by the unit covers 7, 8. Thus, it is possible to protect the joint assembly 6 and prevent the total bearing assembly from hanging down under its own weight during transportation or handling. This further improves handling of the total driving wheel bearing assembly.

The outer diameter Da of a fitting surface 9d of the outer member 9 is formed larger than maximum outer diameters Db, Dc of the joint assemblies 3, 4. The reduced diameter portions 7a, 8a of the unit covers 7, 8 are formed as a tapered configuration. Thus, it is possible to easily fit the joint assembly 6 into the knuckle N without damage. Also, it is possible to prevent adhesion of contamination to the total assembly of the bearing. Further, it is possible to keep the total assembly in a mounted condition to the knuckle N until completion of assembly with corner modules of the suspension apparatus and a vehicle. Thus, it is possible to further improve not only the handling, such as transportation, but also the workability during assembly.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The unit cover can be applied to a joint assembly that includes a pair of constant velocity universal joint and a drive shaft. Also, it may be applied to a total driving wheel bearing assembly with the joint assembly and united arrangement of a wheel hub, a double row rolling bearing and a constant velocity universal joint.

What is clamed is:

1. A joint assembly comprising:
   a secured type constant velocity universal joint, a slide type constant velocity universal joint, and substantially cylindrical elastomer unit covers;
   said secured type constant velocity universal joint including one outer joint member formed with a plurality of curved and axially extending first track grooves on its inner circumference, a joint inner ring formed, on its outer circumference, with second track grooves opposite to the first track grooves, torque transmitting balls contained within ball tracks formed by said first and second track grooves, a cage for rollably holding the torque transmitting balls within the ball tracks, a drive shaft with one end connected to the joint inner ring, and a boot mounted on the drive shaft and on an outer circumference at an opened side of said one outer joint member;
   said slide type constant velocity universal joint including a boot mounted on said drive shaft and on an outer circumference at an opened side of an outer joint member; and
   said unit covers having reduced diameter portions and being mounted on the outer circumferences of both the constant velocity universal joints;
   each of the unit covers is formed as two parts divided along a parting plane including its axis and has radially extending flat abutting surfaces on the parting plane, and fastening portions formed on the abutting surfaces and adapted to be engaged, via a elastic deformation of them, so that the unit covers are detachably mounted on both the constant velocity universal joints.

2. The joint assembly according to claim 1, wherein each of said fastening portions comprises a projecting portion having a tip of enlarged diameter and a recessed portion having an annular groove formed substantially at a center of an inner diameter portion, and wherein a tip of the projection is adapted to be fit into the annular groove with the tip elastically expanding the inner diameter portion.

3. The joint assembly of claim 1, wherein hooks are formed on the outer circumstances of the abutting surfaces, wherein the hooks and opposing hooks are arranged axially offset to each other.

4. The joint assembly of claim 1, wherein each of said unit covers is formed with a symmetrical configuration.

5. A total assembly of a driving wheel bearing apparatus comprising:
   a driving wheel bearing apparatus formed as a unit of a wheel hub, a double row rolling bearing, a constant velocity universal joint and an outer joint member integrally connected to the wheel hub via plastic deformation, and a joint assembly of claim 1 connected to the driving wheel bearing apparatus, said double row rolling bearing including:
   an outer member integrally formed, with a body mounting flange to be mounted, on its outer circumstance, on a knuckle, a fitting surface on said outer member fit into the knuckle (N) and said outer member inner circumstance including double row outer raceway surfaces;

an inner member comprising the wheel hub integrally formed at its one end with a wheel mounting flange and said wheel hub outer circumference including an inner raceway surface opposed to one of the double row outer raceway surfaces, and the outer joint member of the constant velocity universal joint integrally formed with a hollow shaft portion fit into the wheel hub and said hollow shaft portion outer circumference including an inner raceway surface opposed to the other one of the double row outer raceway surfaces; and double rows of rolling elements freely rollably contained between the inner member and the outer member;

a pitch circle diameter of an inner side row of rolling elements of the double rows of rolling elements is set larger than a pitch circle diameter of an outer side row of rolling elements, and an outer diameter of a fitting surface of the outer member is formed larger than maximum outer diameters of the joint assembly.

* * * * *

UNITED STATES PATENT AND TRADEMARK OFFICE
CERTIFICATE OF CORRECTION

| | |
|---|---|
| PATENT NO. | : 7,758,433 B2 |
| APPLICATION NO. | : 12/477991 |
| DATED | : July 20, 2010 |
| INVENTOR(S) | : Kiyoshige Yamauchi |

It is certified that error appears in the above-identified patent and that said Letters Patent is hereby corrected as shown below:

Column 10
Line 25 "8b," should be --8b.--

Signed and Sealed this
Twenty-fifth Day of January, 2011

David J. Kappos
*Director of the United States Patent and Trademark Office*